United States Patent [19]

Cross et al.

[11] 3,841,146

[45] Oct. 15, 1974

[54] AUTOMATED VOLUME MONITORING SYSTEM

[75] Inventors: Newbold O. Cross, Berkeley Heights; Jeffrey L. Thompson, Hopatcong, both of N.J.

[73] Assignee: Esso Research and Engineering Company, Linden, England

[22] Filed: Mar. 26, 1973

[21] Appl. No.: 344,993

[52] U.S. Cl. ............................................. 73/49.2
[51] Int. Cl. ........................................... G01m 3/32
[58] Field of Search...................... 73/40, 40.5, 49.2

[56] References Cited
UNITED STATES PATENTS

| | | | |
|---|---|---|---|
| 3,230,760 | 1/1966 | Fryer et al. | 73/49.2 |
| 3,350,704 | 10/1967 | Kessler | 73/40 |
| 3,466,642 | 9/1969 | Terramorsi | 73/40.5 R |
| 3,538,746 | 11/1970 | Jacobs | 73/49.2 |

*Primary Examiner*—S. Clement Swisher
*Attorney, Agent, or Firm*—F. Donald Paris

[57] ABSTRACT

A system for detecting leaks in buried storage tanks by measuring change in liquid level, comprising a product containing reservoir suspended from an electronic load cell for measuring any weight loss and thermal sensor for detecting any change in average product temperature. A volume calculating circuit combines the weight change and temperature change signals to produce a temperature corrected output which may be suitably displayed. Zero change in net volume is indicated if the product level changes due only to a rise or fall in temperature. However, if the product level changes due to a leak or ground water entering the tank an accurate measurement of the volume change is obtained.

10 Claims, 4 Drawing Figures

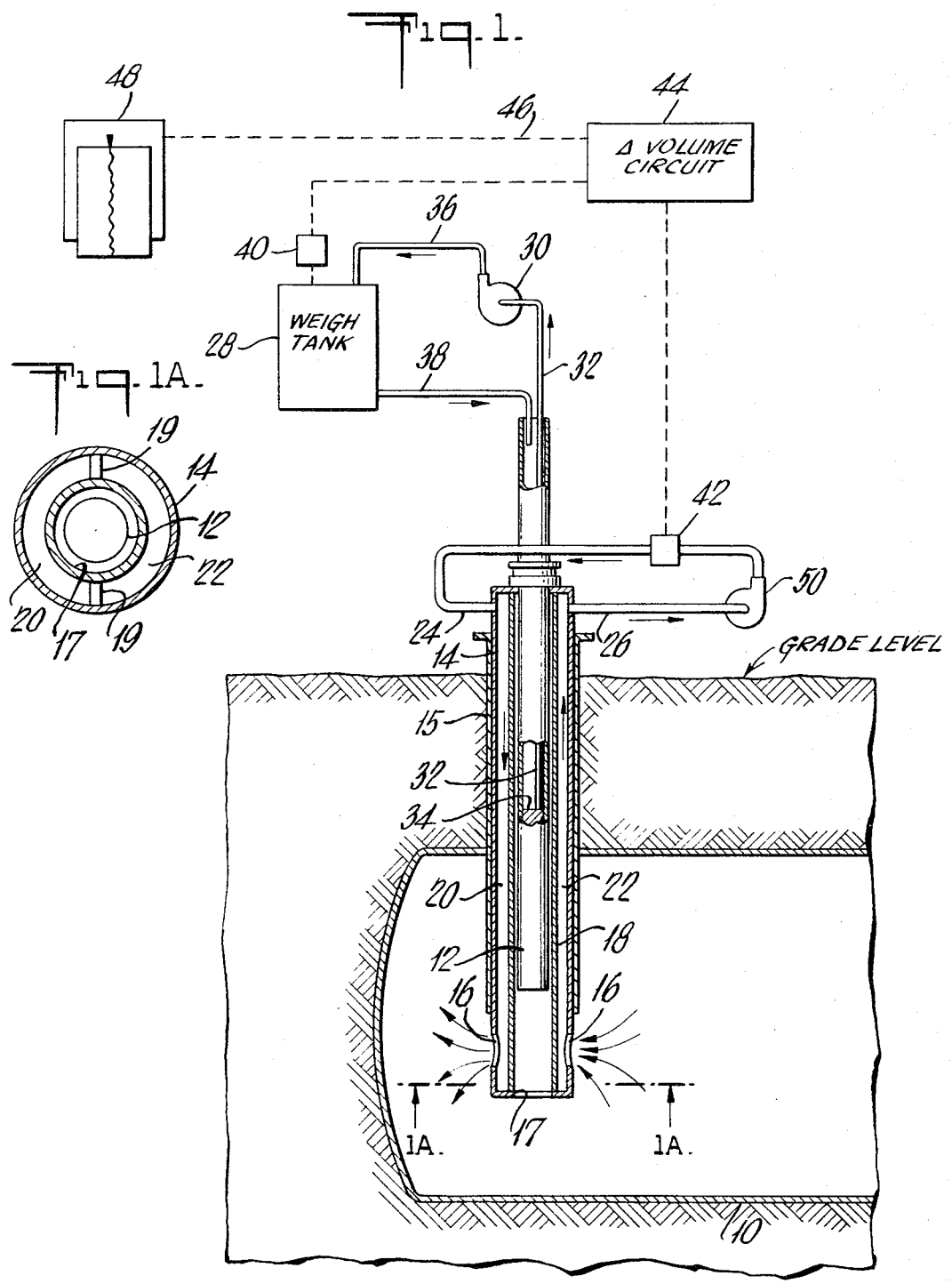

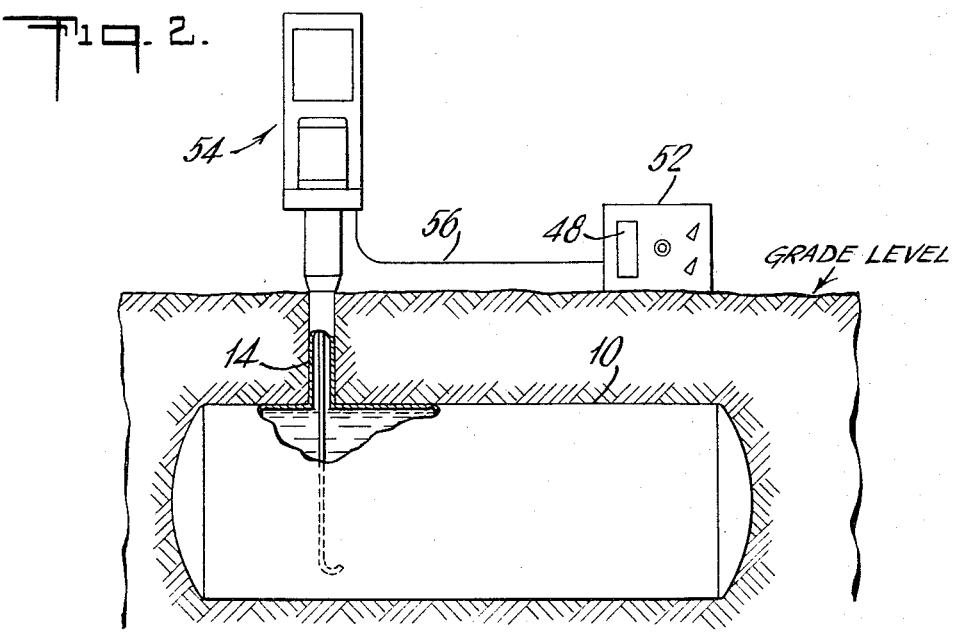
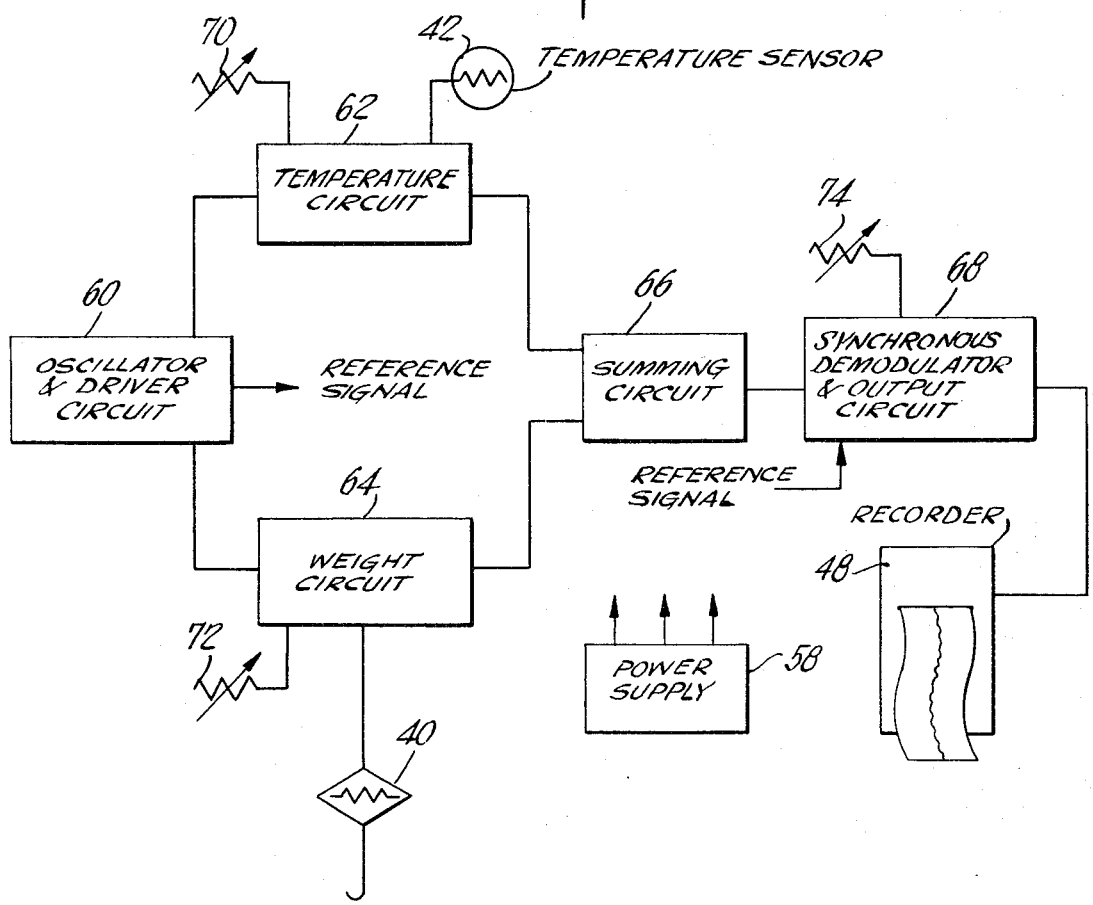

AUTOMATED VOLUME MONITORING SYSTEM

BACKGROUND OF THE INVENTION

There presently exists a need for an in-place tank inspection, particularly for underground product storage tanks, that is economical, practical and simple. Studies have shown that existing techniques for such inspection are inadequate. While there exists a variety of leak detection schemes, systems based on measuring the change in liquid level have been found to be the most sensitive, quantitative and simple.

At present there are several leak detection systems which involve the measurement of liquid level changes, the most accurate of which is commonly known as the Kent-Moore Tank Tightness Tester. Reference may be had to NFPA Publication No. 329, pp. 48–56, for details of the Kent-Moore technique. However, this technique has various disadvantages and limitations as discussed below. This technique, upon which nearly all underground storage tank integrity testing is performed, has a 0.05 gallon per hour sensitivity threshold. According to this method, the tank in question is isolated from any intertank manifolding and is completely filled with the product, such as gasoline. An approximately 4-foot clear plastic standpipe is attached to the storage tank's filler neck and filled to near the 4-foot mark. The system then is examined to ensure that there are no leaks in the dispensers or associated plumbing. The 4-foot head is maintained until there is evidence that tank end expansion into the soil has ceased, then the standpipe level is lowered about 1 foot and the actual leak test is begun. This lower standpipe level is maintained constant, and a pump simultaneously circulates the product in the tank to eliminate thermal gradients. An electronic thermometer monitors the average product temperature. This is important especially in the case of gasoline, which has a thermal expansion coefficient of 0.0006 gallons per gallon per °F. and hence a drop of average product temperature by 1°F. corresponds to an apparent "loss" of 6 gallons in a 10,000 gallon tank, which is 120 times the hourly leak threshold for this technique. About every 15 minutes, the test operator must add or subtract product from the standpipe to maintain a constant test level, read the product temperature, factor in the size of the tank under test, and then calculate the net tank contents with arithmetic accuracy to about eight decimal places. The disadvantages of this technique are readily apparent, particularly the need for the involvement of the operator in collecting data and calculating tank contents.

SUMMARY OF THE INVENTION

The present invention relates to an automated volume monitoring system and more particularly to a novel system and technique which is simple and automated, and has greater practicality and improved sensitivity and accuracy than systems heretofore available. The present invention eliminates the need for operator collection of data and calculation of net tank product volume change ($\Delta v$) by automatically compensating for product volume changes caused by differences in temperature and displaying the corrected $\Delta v$ values in a suitable manner.

While the present invention incorporates the circulating pump and temperature sensing element of the prior art technique discussed above, the remainder of the system is significantly different and provides the improvements mentioned above. According to this invention a fixed test level above the tank shell is maintained in the tank under test by means of a small suction pump having its inlet positioned at the desired level. This can make any intertank manifolding, plumbing and vent piping leaks non-significant because the test level may be set as low as 1–2 inches above the top of the tank shell. In the event that detecting leaks in associated piping is of interest, the test level may be easily elevated, thus applying pressure to that piping. The small pump discharges into a 5 to 10 gallon reservoir container which is provided with a gravity drain return into the tank under test, which maintains the test level. The weight of the reservoir is measured by an electronic load cell and is a measure of product mass lost or gained due to leakage or temperature expansion. The reservoir weight and average product temperature are operated upon in an electronic circuit to derive any actual tank loss. The circuit output may be displayed in a suitable manner such as on a strip chart recorder.

BRIEF DESCRIPTION OF THE DRAWINGS

FIG. 1 schematically illustrates an automated leak volume monitoring system according to the present invention;

FIG. 1A is a cross-sectional end view taken substantially on the line 1A—1A of FIG. 1;

FIG. 2 schematically illustrates a typical commercial embodiment of the automated leak volume monitoring system of FIG. 1 for underground storage tanks; and FIG. 3 is a block diagram of the weight and temperature tank leak detector circuit.

DESCRIPTION OF THE PREFERRED EMBODIMENT

Having reference to the drawings wherein like parts are designated by the same reference numeral throughout the several views, FIG. 1 schematically illustrates a system according to the present invention for detecting a leak in a conventional underground storage tank 10. A removable assembly comprises variable height metal tube 12, circulation pipe 14, and central tube 18 which are inserted into a standard fill pipe 15 of the storage tank. The tube 12 is adjustable to permit variations in head height of the product and is inserted into the pipe 14. This adjustability facilitates testing at lower liquid heads such as when a separate test is to be conducted to determine whether an indicated leak is in interconnecting piping or the tank and is advantageous because excavation and disconnection of the interconnecting piping is eliminated. The bottom end of the pipe 14 is provided with two openings 16 to create a circulation swirl in the product contained in the tank 10, which ensures thorough product mixing. The pipe includes a centrally disposed, isolated coaxial chamber 18, connected to the tank contents via orifice 17, which slidably receives the tube 12 therein and peripheral circulation pump inlet and outlet chambers 20, 22. In order to separate the suction from discharge flow in the annular space between the pipe 14 and the chamber 18, two vertically extending sealing strips 19 are incorporated to isolate the chambers 20 and 22. At the upper end of the pipe (above grade level) are inlet conduit 24 and outlet conduit 26 which connect together and with chambers 20 and 22 provide, respectively, to provide a continuous flow channel for the product, the purpose of which will be explained in detail hereafter. A reservoir container 28, which preferably may have a 5 to 10 gallon capacity, is connected via a standard self-priming suction pump 30 having an inlet 32 located at about the desired product test level 34 and an outlet 36 for discharge into the reservoir. A gravity feed line 38 drains from the reservoir, at a rate less than pump 30 capacity, back to the tank to maintain the product test level at the desired height above the top of the shell.

In operation if product leakage or thermal contraction causes a drop in the test level 34 in tube 12, the suction inlet 32 of pump 30 will lose contact with the liquid surface. The gravity drain 38 from the reservoir 28 will continue to supply product to tank 10 via tube 12 until the end of the suction inlet which is at the desired test level is reached, whereupon pump rate exceeds gravity feed rate, thus maintaining the desired level 34. Similarly, should ground water in-leakage or thermal expansion cause a rise in test level 34, pump 30 will transfer the excess product to reservoir 28 until the suction inlet 32 is again just exposed at the test level 34. A conventional electronic load cell 40 from which the reservoir container 28 is suspended measures any weight loss, which corresponds to a volume change in product in the tank, and a conventional thermal sensor 42, which is interposed between the lines 24, 26, detects any change in the average product temperature. A volume calculating circuit 44 receives signals from the weight load cell 40 and the temperature sensor 42 which are a function of weight and temperature changes and combines these signals to produce a temperature corrected output signal at 46 which may be displayed on a strip chart recorder 48. The circuit 44 is designed so that if the product level change is due only to a rise or fall in temperature, the recorder will indicate zero net volume change. If, however, product is being lost through a leak or ground water is entering the tank, an accurate measurement of volume change will be indicated on the chart. A standard circulation pump 50 is connected in the flow channel including lines 24, 26 to eliminate or at least minimize thermal variations in the contents of the tank under test and to provide ample product flow past the thermal sensor 42.

A typical application of this leak test technique is for leak testing buried gasoline storage tanks such as are found in service stations and garages. FIG. 2 is a schematic illustration of a typical commercial design for the subject automated leak monitoring system. Basically, this system comprises two functional units - one generally designated 52 and comprising the control and display unit and the other generally designated 54 comprising the pumps, reservoir, and load cell. The control and display unit 52 typically may include the tank volume and product density controls for calibration of the test constants, a function selection switch, a temperature difference zero adjustment and a weight zero adjustment for initial setting up of the test. This unit also contains the strip chart recorder 48 which provides a continuous display or readout of time rate of temperature corrected volume (that is, leak rate) in the weigh tank. Obviously other suitable recording means may be employed. The unit is adapted for connection to a standard 110 volt power supply. The other functional unit 54 typically may be attached to a standard quick connect coupling which fits into the tank fill pipe 14, and includes the weigh tank or reservoir 28 and the load cell 40 which constantly monitors change in weight of the liquid in the reservoir which represents any change in liquid level, and the motor driven centrifugal pump 50 which circulates the entire volume of the storage tank to achieve uniform temperature as well as the suction pump 30. This unit 54 is electrically coupled to the control and display unit 52 via line 56. It is preferred to vertically mount the circulating pump and the motor concentric with the tank fill pipe 14 in order to eliminate the need for separate suction and discharge lines. Also, the weigh tank preferably should be mounted on top of the pump-motor combination in order to reduce the number of separate components at the test site.

FIG. 3 is a block diagram of the volume measurement circuit which comprises the weight and temperature sensing elements 40 and 42. For simplicity, stability and resistance to electrical interference it is preferable to employ a synchronous alternating current system although conventional AC or direct current can be employed. The basic system comprises five functional blocks and a standard power supply 58. An oscillator and driver circuit 60 supplies like constant amplitude signals to the temperature circuit 62 and the weight circuit 64 each of which comprises a standard bridge-amplifier circuit for deriving product temperature and reservoir weight change signals and a reference for the synchronous demodulator 68, a summing circuit 66 to combine the weight change and temperature change signals so that apparent volume changes due only to temperature changes are eliminated, and the synchronous demodulator circuit 68 to convert the AC signal to a DC signal suitable for driving the recorder 48. The weight sensing cell 40 which may comprise a commercial strain gauge load cell and temperature sensor 42 which may comprise a temperature sensitive resistor (i.e., thermistor) are connected into bridge circuits as shown.

In the temperature circuit 62 a potentiometer 70 is used for making the appropriate adjustment for tank size and is calibrated directly in thousands of gallons. Similarly, potentiometer 72 in the weight circuit is set at the beginning of a leak test to correspond to the actual capacity or volume of the tank under test.

In the summing circuit 66 the weight change in the reservoir is compensated by removing that part of the weight change caused solely by thermal expansion (or contraction). The volume change in the reservoir (i.e., the uncompensated leak volume) is the density of the liquid times the sensed change in weight. Liquid density is taken into account by means of a density adjustment. This volume change signal is temperature compensated by subtracting an amount equal to the volume change due only to thermal expansion. This amount is the thermal coefficient of expansion per gallon (which for gasoline is 0.0006/gal/gal/°F.) times the number of gallons in the tank (actual tank volume) times the amount of temperature change in the tank contents. The proper weight change and temperature change signals are then algebraically summed to provide a net output. This output signal which is a temperature compensated volume signal is fed into the demodulator which produces a DC voltage, proportional to the amplitude of the input signal, that drives the recorder. The demodulator is provided with a potentiometer 74 for calibrating the recorder sensitivity in gallons/inch of pen travel.

In general, the test procedure for the automated leak volume monitoring system initially is similar to the operating procedure employed by the Kent-Moore technique. Thus, the tank must be filled before the test and product added to allow for increased volume due to the tank ends bulging into the surrounding earth or backfill. A period of time is required to circulate the contents of the tank to achieve uniform product temperature. The actual time required depends upon the difference in temperature between the tank contents and added product as well as the tank volume. After uniform product temperature conditions are achieved, actual calculation and data display are automatic. In reference to FIG. 2 after the tank is filled with product, the pump and weighing assembly constructed according to the present invention is attached to the neck of the standard tank fill pipe. Then, the pumps are started and product is added or withdrawn from the reservoir to maintain the level approximately 50 percent full. The control unit is connected to a suitable power supply and the power is turned on. On the control unit the function selector switch is alternately positioned between "weight" and "temperature" positions and the weight and temperature zero controls are adjusted so that the strip chart recorder pen is maintained in a central location. The appropriate tank volume for the tank being tested is selected. After this is done the function selector switch is set at the temperature position and, if necessary, circulation of the product should be continued until the strip chart shows no more than about ±.01 gal. variation. Product density is then measured and the product density control is set at this value. Then the strip chart is observed for a period of time sufficient to determine if a leak is present. The presence of a leak is revealed by a constant negative slope of the chart trace; indicating product out leakage or a positive slope indicating ground water in-leakage.

There has been described an automated leak volume monitoring system for the leak testing of storage tanks. This novel system has the advantages of saving time which results from the automated plotting of data; reduced possibilities for human error due to miscalculations when making corrections for product temperature variations; the total test period is reduced since false leak indications caused by tank end bulging are minimized by employing a reduced test head; and leaks in attendant piping can be separated from tank leaks by lowering the test head after a leak indication is found.

It will be understood that various changes in the details, arrangement of parts and operating conditions which have been herein described and illustrated in order to explain the nature of the preferred embodiment of this invention may be made by those skilled in the art within the principle thereof and that reference should be made to the following appended claims which determine the scope of this invention.

What is claimed is:

1. An automated volume monitoring system for a product storage tank comprising:
   a. a vertically adjustable tube for containing product at a predetermined test level and adapted to be disposed in the fill pipe of said storage tank;
   b. thermal sensor means for sensing the average temperature of said product;
   c. suction means operably disposed for contact with said product surface substantially at said predetermined test level within said tube;
   d. a reservoir for containing a predetermined amount of said product;
   e. level maintenance means connected to said suction means and said reservoir operable in response to a change in said predetermined test level so as to maintain said test level substantially constant;
   f. drain means connected between said reservoir and said tube for supplying product from said reservoir to said tube when said suction means loses contact with said product surface until said predetermined test level is obtained; and
   g. load cell means operably associated with said reservoir for measuring any weight change of the product therein.

2. An automated volume monitoring system according to claim 1 including volume calculating means operably connected with said thermal sensor means and said load cell means for producing a temperature corrected output signal representative of any change in volume of said product in said reservoir.

3. An automated volume monitoring system according to claim 2 including recorder means connected to said volume calculating means for displaying said temperature corrected output signal whereby product-out leakage is indicated by a constant negative slope and ground water in-leakage is indicated by a constant positive slope.

4. An automated volume monitoring system according to claim 2 wherein said volume calculating means comprises an electronic circuit including circuit means for providing signals corresponding to product temperature and weight change in said reservoir, and a summing circuit connected for combining said signals to provide said temperature corrected output signal so that changes in product volume due only to temperature are eliminated.

5. An automated volume monitoring system according to claim 1 including pump means for continuously circulating a sample flow of the product past said thermal sensor and minimizing thermal variations within the product contained in said storage tank.

6. An automated volume monitoring system according to claim 5 wherein said tube is coaxial with said fill pipe and said fill pipe includes separate annular peripheral inlet and outlet chambers in operable communication with said pump means.

7. An automated volume monitoring system according to claim 1 wherein said level maintenance means comprises a pump for maintaining said test level so that when said test level drops said pump transfers additional product to said tube and when said test level rises said pump transfers excess product to said reservoir.

8. A volume monitoring system for a product storage tank comprising:
   a. tube means for containing said product at a predetermined head height;
   b. reservoir means separate from said storage tank for containing a predetermined amount of said product; and
   c. means operably connected between said tube means and said reservoir means for maintaining said predetermined head height substantially constant.

9. A volume monitoring system according to claim 8 wherein said tube means is adjustable to permit variation in the head height of said product.

10. A method for determining a change in volume of a product in a storage tank as a result of leakage comprising the steps of a. establishing in a tube within said storage tank a substantially constant test level of said product at a height above the tank casing;
b. providing a reservoir of said product separate from said storage tank;
c. obtaining uniform temperature of the product in said tank;
d. transferring sufficient product between said tube and said reservoir in response to changes in said head height in order to maintain said predetermined head height substantially constant;
e. weighing the change in volume of product in said reservoir which change corresponds to a volume change in product in said storage tank; and
f. determining the amount of product volume change in said storage tank as a function of the product volume change in said reservoir due only to leakage.

* * * * *